United States Patent
Fischel (10) Patent No.: US 8,283,062 B2
(45) Date of Patent: *Oct. 9, 2012

(54) ELECTROCHEMICAL CELLS UTILIZING TAYLOR VORTEX FLOWS

(75) Inventor: Halbert Fischel, Santa Barbara, CA (US)

(73) Assignee: Global Energy Science, LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/194,049

(22) Filed: Jul. 29, 2011

(65) Prior Publication Data

US 2012/0077100 A1    Mar. 29, 2012

Related U.S. Application Data

(62) Division of application No. 12/800,658, filed on May 20, 2010, now Pat. No. 8,017,261.

(60) Provisional application No. 61/220,583, filed on Jun. 26, 2009.

(51) Int. Cl.
*H01M 2/38* (2006.01)
*H01M 8/06* (2006.01)
*H01M 8/04* (2006.01)
*H01M 8/08* (2006.01)

(52) U.S. Cl. .......... 429/69; 429/416; 429/444; 429/451; 429/498

(58) Field of Classification Search .................... 429/69, 429/416, 444, 451, 498
See application file for complete search history.

(56) References Cited

U.S. PATENT DOCUMENTS

| | | | |
|---|---|---|---|
| 3,132,973 A * | 5/1964 | Duddy et al. .................. | 429/434 |
| 3,663,298 A * | 5/1972 | McCoy et al. ................. | 429/404 |
| 5,830,593 A | 11/1998 | Nielson | |
| 6,165,636 A * | 12/2000 | Giallombardo et al. ....... | 429/465 |
| 6,319,293 B1 | 11/2001 | Debe et al. | |
| 6,713,206 B2 | 3/2004 | Markoski et al. | |
| 7,488,547 B1 | 2/2009 | Iacovelli | |
| 7,964,301 B2 * | 6/2011 | Fischel et al. .................. | 429/69 |
| 7,972,747 B2 * | 7/2011 | Fischel ......................... | 429/513 |
| 2007/0020142 A1 | 1/2007 | Federspiel et al. | |
| 2012/0003518 A1* | 1/2012 | Fischel ......................... | 429/69 |

OTHER PUBLICATIONS

Gabe et al, The rotating cylinder electrode: a review of development Reviews of Applied Electrochemistry of Applied Electrochemisrty (1983) pp. 3-22.
Gabe et al, The rotating cylinder electrode: its continued develeopment and application, Reviews of Applied Electrochemistry 49, J. of Applied Electrochemistry (1998) pp. 759-780.
Bagotsky, Fundamentals of Chemistry, Second Edition, John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.

(Continued)

*Primary Examiner* — Basia Ridley
*Assistant Examiner* — Jonathan G Leong
(74) *Attorney, Agent, or Firm* — Sheldon L. Epstein; Malcolm J. Chisholm, Jr.; Pamela Curbelo (57) ABSTRACT

Electrochemical cells (10), such as fuel cells (12) and fuel reformers (14), with rotating elements or electrodes (34, 24) that generate Taylor Vortex Flows (28, 50) and Circular Couette Flows (58) in fluids such as electrolytes and fuels are disclosed.

39 Claims, 6 Drawing Sheets

OTHER PUBLICATIONS

Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.

Newman, Electrochemical Systems, Third Edition, John Wiley & Sons, Inc., Hoboken, NJ, USA, © 2004, Chapter 1—Introduction, §1.4 Transport, pp. 8-18.

Bagotsky, Fundamentals of Chemistr Edition, John Wiley & Sons, Inc., Hoboken, NJ, USA, © 2006, Preface to First Edition, pp. xix-xxi & §1.6 Classification of Electrodes and Electrode Reactions, pp. 12-15.

Newman, Electrochemical Systems, Third Edition, John Wiley & Sons, Inc., Hoboken, NJ, USA, © 2004, Preface to the First Edition, pp. xix-xx & §1.2 Thermodynamics and Potential, pp. 4-7.

Pletcher & Walsh, Industrial Electrochemistr II, London, UK, © 1982, Preface pp. viii-x; Chapter 7, §(d) pp. 346-350 & Chapter 11, p. 543.

R. Ferrigno et al, "Membraneless Vanadium Redox Fuel Cell Using Laminar Flow", JACS Communications, vol. 124, 2002, pp. 12930-12931.

Bonnecaze et al, On the behavior of the Porous Rotating Disk Electrode, Journal of the Electrochemical Society, 154 (2) F44-F47, © 2007.

* cited by examiner

AXIAL  FLOW

ELECTROCHEMICAL CELLS UTILIZING TAYLOR VORTEX FLOWS

CROSS-REFERENCE TO RELATED APPLICATIONS

This application is a division of U.S. patent application Ser. No. 12/800,658 filed 20 May 2010, now U.S. Pat. No. 8,017,261 of 13 Sep. 2011, which claims the benefit of my U.S. Provisional Application No. 61/220,583 filed 26 Jun. 2009.

This application, identified as Case A1, is related to the following applications of Halbert P. Fischel:

Case A: Electrochemical Cells Utilizing Taylor Vortex Flows, Ser. No. 12/800,658, now U.S. Pat. No. 8,071,261 of 13 Sep. 2011;

Case B: Fuel Reformers Utilizing Taylor Vortex Flows, application Ser. No. 12/800,710, now U.S. Pat. No. 8,187,560 of 29 May 2012;

Case C: Chemical Process Accelerator Systems Comprising Taylor Vortex Flows, application Ser. No. 12/800,657, now U.S. Pat. No. 8,147,767 of 3 Apr. 2012.

Case D: Direct Reaction Fuel Cells Utilizing Taylor Vortex Flows, application Ser. No. 12/800,672, now U.S. Pat. No. 7,972,747 of 5 Jul. 2011; and Case E: Dynamic Accelerated Reaction Batteries, filed application Ser. No. 12/800,709 with Philip Michael Lubin and Daniel Timothy Lubin, now U.S. Pat. No. 7,964,301 of 21 Jun. 2011.

Case A, Case B, Case C, Case D and Case E were all filed on 20 May 2010. This application and all of the enumerated applications have been assigned to the same assignee. The enumerated applications are incorporated herein by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of electrochemical cells, such as those used to convert chemical energy into electrical energy (e.g. fuel cells), having means to provide relative motion between an electrode and an electrolyte—including means for rotating an electrode (U.S. Class 429/67-69, Int. Class H01M), to achieve accelerated chemical reaction rates promoted by Taylor Vortex Flows (TVF) and Circular Couette Flows (CCF).

2. Description of Related Art

Electrochemical cells, such as fuel cells used to convert chemical energy into electrical energy, are well known. In general, fuel cells comprise an anode electrode reactive with a hydrogen-based or reducing fuel (reductant) and a cathode electrode reactive with an oxidizer. The electrodes are separated from each other by an electrolyte fluid that transports, 1) protons from the anode to the cathode where they react with both the oxidizer and with electrons travelling from the anode through an external electrical circuit to the cathode to form a compound, such as water or 2) hydroxyl ions from the cathode to the anode to form water there.

Fuel cells rely on molecular kinetics, e.g., temperature, reactant concentration and catalysis to induce molecules to react at a catalytic surface. Prior art teaches that there are five principal methods to increase reaction rates and thereby increase output current. They are 1) raise temperature and/or pressure, 2) improve catalyst activity, 3) augment electrode surface activity by adding other forms of resonant energy to electrodes or to reactants (U.S. Pat. No. 7,482,072 to, Brooks et al), 4) increase reactant transport rates to or from reaction surfaces (mass transport) and 5) raise the catalyst surface area/electrode area ratio.

Operational data for prior art fuel cell electric currents disclose that these currents do not exceed 1.0 ampere/$cm^2$ and generally are in a range of 0.4 to 0.8 ampere under load at about 0.75 volt. This equates to about 0.3 to 0.5 watt/$cm^2$ of anode or cathode surface. Some of the more common limits are imposed by a) mass-transport losses of ions moving through electrolytes, b) surface losses at catalysts caused by intermediate reaction products attracted to active sites, c) mass-transport losses of fuel, oxidizer and ions moving within electrodes to reach catalysts where they can react and d) overpotential decrement due to limited catalyst activity.

In most fuel cells, a proton exchange membrane (also known as a polymer electrolyte membrane or PEM) that is permeable to protons, but not to some fuels or oxidizers, is located within the electrolyte to prevent wasteful and dangerous cross-over of fuel and oxidizer within the electrolyte. The membrane causes both decreased conversion efficiency and increased loss of fuel or oxidizer.

SUMMARY OF THE INVENTION

A common belief about fundamental principles governing operation of a fuel cell is that the PEM must be present to conduct ions selectively from one electrode to the other. That is false. Prior art PEMs are used to prevent unprocessed fuel and oxidizer from crossing a gap between their facing electrodes and they must not concomitantly prevent at least one ion from crossing that gap. An ion's charge and direction is dictated by an internal cell balance for the external electron current.

The presence of the PEM significantly increases the cell's internal resistance to ionic flow and consequently reduces the cell's current capacity. While, it is known that PEMs need to be eliminated in order to improve cell performance, techniques such as creating laminar flows in electrolytes do not substantially improve fuel cell performance.

Hydrogen gas is a preferred fuel for most fuel cells. Because pure hydrogen gas may be unavailable or inconvenient to handle, hydrogen-based fuels such as methane, methanol and ethanol provide feedstock to fuel reformers that provide $H_2$.

Prior art fuel reformers generally produce large quantities of $CO_2$ and CO as undesirable byproducts. $H_2$ acquired in this way has to be further purified for use as fuel in most fuel cells, with the exception of those based upon molten carbonate electrolyte. External fuel reforming adds complexity to a portable system. My fuel reformer invention is also described in Case B.

Some prior art electrochemical cells incorporate rotating or moving electrodes that generate flows to the electrode surfaces. However, these electrodes are found only in applications where an electrode is immersed in an electrolyte bath to expose it to an aggregation of a reductant, oxidizer and electrolyte. It is well known that use of electrode surfaces in such systems that produce turbulence are preferred to enhance constituent mixing, which is basically incompatible with operation of fuel cells.

This invention uses Taylor Vortex Flows ("TVF"—also known as Taylor-Couette Flows) in electrochemical cells to achieve enhanced reaction rates by a) reducing mass-transport losses, b) preventing fuel and oxidizer crossover, c) capturing reaction products that can degrade catalysts and electrolytes and d) eliminating those degrading reaction products from the cells, e) increasing temperature to reduce electrode overpotentials and raise reaction rates and f) permitting higher pressures and concentrations to accelerate reactions at both electrodes.

TVF can occur when a viscous fluid (e.g. electrolyte) is confined in a gap between two cylinders where one cylinder is rotating with respect to the other. For low differential angular velocities, in terms of circumferential Reynolds number, $R_c$, the flows are steady, purely azimuthal and known as Circular Couette Flows.

Electrodes described here use TVF that automatically generate accelerated, stable laminar flows at the electrode surfaces. These laminar flows increase electrode surface electrical current density while preventing a mixing of fuels and oxidizers that would waste energy and lower conversion efficiency—even for facing, rough-surfaced electrodes. Electrodes that present high surface area/projected area ratios of catalytic surfaces to reactive chemicals are described in Case C and Case D.

In 1923, Sir Geoffrey Ingram Taylor published a ground-breaking paper on stability of the Couette flow. He reported that when the differential velocity, between the opposing cylinder surfaces forming a gap, is increased to a range within observed minimum and maximum speeds, Couette flow becomes unstable. Then, a secondary steady-state is created that is characterized by contra-rotating, axisymmetric, toroidal vortices with unique properties. This secondary steady-state is known as TVF.

Mechanical systems generating TVFs are well known in the prior art of particulate filtration. For example, the following U.S. patents, hereby incorporated herein by reference, describe systems employing TVFs for filtering blood without clogging a plasmapheresis membrane filter:

| # | Date | Title | Inventor |
| --- | --- | --- | --- |
| 4,755,300 | 07/1988 | Couette Membrane Filtration Apparatus... | Fischel, R et al. |
| 4,808,307 | 02/1989 | Couette Membrane Filtration Apparatus... | Fischel, R et al |
| 4,919,817 | 04/1990 | Blood Cell Washing Systems & Method | Schoendorfer et al |
| 5,034,135 | 07/1991 | Blood Fractionation System & Method | Fischel, H. |
| 5,053,121 | 10/1991 | Blood Cell Washing System & Methods | Schoendorfer et al |
| 5,194,145 | 03/1993 | Method...For Separation of Matter... | Schoendorfer |
| 5,376,263 | 12/1994 | Pump Control Apparatus...Rotating... | Fischel, H. |
| 5,464,534 | 11/1995 | Blood Fractionation System & Method | Fischel, H. |
| 5,738,792 | 04/1998 | Method For Separation of Matter... | Schoendorfer |
| 5,783,085 | 07/1998 | Blood Fractionation Method | Fischel, H. |

Particulate filters are readily distinguished from electrochemical cells, such as fuel cells, because 1) the filters lack electrodes and 2) the direction of flow of reactant fluids is diametrically opposite to that of fuel cells.

In particulate filters such as these blood filters, a fluid, such as blood, containing a suspended particulate, such as blood cells, is pumped through a gap between opposing cylinder walls. One wall, usually the outer, is solid while the other is porous. The porous wall usually incorporates filter media and rotates within the outer wall. Fluid penetrates the filter media on the inner wall where TVF-accelerated high-shear-rate laminar shear prevents particulates from entering and clogging the filter media pores. TVF trap the particulates and transport them to an exit from the gap to be purged from the system.

Electrochemical cells, such as fuel cells, of this invention comprise different structures and employ TVF in a different manner. For example, fuel cells incorporate porous anode and cathode electrodes separated by electrolyte. Fuel and oxidizer pass, respectively, from chambers behind their associated electrodes toward the electrolyte; but, do not react with each other in the electrolyte or with the opposite electrode because 1) electrolyte flow keeps them separated and 2) they are in this invention almost fully converted to ions within their respective electrodes. Fluid media, contaminants or reaction byproducts are not expunged from fuel or oxidizer entry chambers because they are eliminated when the electrolyte is recycled outside of the cell.

This disclosure describes systems and methods for management of any type of fluid electrolyte as well as fuel and oxidizer in electrochemical cells. Cells of this invention have reductant, oxidizer and ionic conductivities that are orders of magnitude greater than prior art cells so that ionic transfer time between electrodes and reductant/oxidizer/ion access to catalyst surfaces that have been a combined mass transport limitation of electrical-current-producing chemical reactions now are negligible.

For cells incorporating PEM electrolytes, the dominant limitation on ionic conductivity is the rate at which a single ion dragging several water molecules can migrate through a polymer molecular structure while two phases; namely a) ions dissolved in liquid, and a gas can arrive at one electrode or b) water molecules and gas at a different electrode can attach to a third phase solid catalyst surface, react and depart as water (steam or condensed liquid) or ions in solution, respectively.

U.S. Pat. No. 6,713,206 issued to L. J. Markoski et al and a paper by R. Ferrigno et al (JACS Communications, vol. 124, 2002, pp. 12930-12931, "Membraneless Vanadium Redox Fuel Cell Using Laminar Flow") teach that a laminar boundary layer on the electrode surface has a protective effect preventing fuel/oxidizer crossover. In order to maintain laminar flow in the cited art, electrolyte velocities must be kept sufficiently low so that the critical turbulent Reynolds Number, Re (not $R_c$), is not exceeded. The present invention of this disclosure succeeds because its cells have electrolyte velocities that result in much higher circumferential Reynolds Numbers, $R_c$, and laminar shear rates stabilized by generated TVFs. Because a requirement for laminar flow can be achieved at much higher laminar shear rates using TVF, as taught here, fuel cells of this invention achieve multiple orders of magnitude higher current densities than non-TVF laminar flow cells.

The controlling factor for laminar shear rates is the minimum value of the hydro-dynamically defined Taylor number, $T_c$ above which desirable energetic vortices are fully established. For example, within the electrolyte or, in some cases, the gaseous fuel as well. Axial Poiseuille-type flow can be further imposed by virtue of recirculation. Also, there is a strong dependence of the critical $T_c$ on the strength of the latter flow by way of its characteristic axial-flow Reynolds number, $R_a$.

Furthermore, there is a requirement to maintain laminar flow at electrode surfaces while promoting TVF within the electrolyte. Care must be taken to restrict the circumferential Reynolds number, $R_c$, to non-turbulent values. A set of distinct variables define a particular range of permissible operating parameters. These variables include predetermined ranges of: 1) temperature, 2) kinematic viscosity of the fluids being employed, 3) their respective rates of recirculation, 4) angular rotation speed, 5) surface characteristics of the electrodes and, 6) physical dimensions of the cell.

Given appropriate operating parameters, neither gaseous reductants, oxidizers, gaseous reaction products nor particle precipitates of the redox reaction at the electrodes can penetrate the TVF. Consequently, reductant and oxidizer crossover is effectively prevented, even though reductant, oxidizer, reaction products and particulates are driven by forced convection directly through their respective porous electrodes directly toward TVF in the electrolyte. Only redox product ions in solution can enter the electrolyte and cross rapidly to the opposite electrode, which is an important feature of electrochemical cells utilizing TVF in electrolyte.

In the case of liquid reductants and oxidizers, such as used in direct methanol and borohydride fuel cells, unreacted liquid fuel or oxidizer should not enter the electrolyte in solution. Optimum results are obtained when residence times of the fuel and oxidizer spent within the catalyzed reaction zones of their respective electrodes exceed their corresponding reaction times to ensure that substantially all the material is processed before the electrode-permeating reaction products, including dissolved ions, enter recirculating electrolyte.

Fuel cells that use methanol, selling for US 12½¢/liter, as fuel would be an economical replacement for internal combustion engines and batteries in vehicles if cell power density could be increased. My invention of a Direct Reaction Fuel Cell (DRFC) utilizing TVF overcome low performance of prior art Direct Methanol Fuel Cells (DMFCs) and Direct Alcohol Fuel Cells (DAFCs). My DRFC invention is described in Case D. These fuel cells can use 100% undiluted methanol and other fuels to achieve an exceptionally high power.

The present invention is a robust electrochemical cell containing a fluid electrolyte between relatively rotating, co-axial cylindrical electrodes that cause Taylor Vortex Flows (TVF) and Circular Couette Flows (CCF) within the electrolyte. TVF eliminates any need for a proton exchange membrane (PEM) to prevent crossover of fuel and oxidizer chemicals through the electrolyte. CCF reduce mass-transport and reaction-rate limitations at electrodes.

It is therefore a first object of the present invention to provide a robust electrochemical cell that eliminates any need for a proton exchange membrane within the cell's electrolyte.

A second object of the present invention to provide a robust electrochemical fuel cell and method for converting electrochemical energy into electrical energy through the use of Taylor Vortex Flows that captures and eliminate reaction by products and prevents crossover of fuel and oxidizer in the cells' electrolytes.

A third object of this invention is to provide criteria for pumping electrolyte into and out of an electrochemical cell at a rate that will optimize creation of Taylor Vortex Flows in the electrolyte.

A fourth object of this invention is to provide structure for an electrochemical cell that will optimize its performance as a fuel cell for converting chemical energy of a fuel into electrical energy that can be used to power an external electrical load.

A fifth object of this invention is to provide electrochemical cells that create dynamic flows within all fluid constituents to induce exceptionally high rates of mass transport to and from several redox chemical reactions.

A sixth object of this invention is to provide electrochemical cells that create dynamic flows within all fluid constituents to increase catalytic electrode reaction rates.

These and other objects of this invention are more fully set forth in the following description of a preferred embodiment of this invention.

DETAILED DESCRIPTION OF THE INVENTION

Figure 1A:
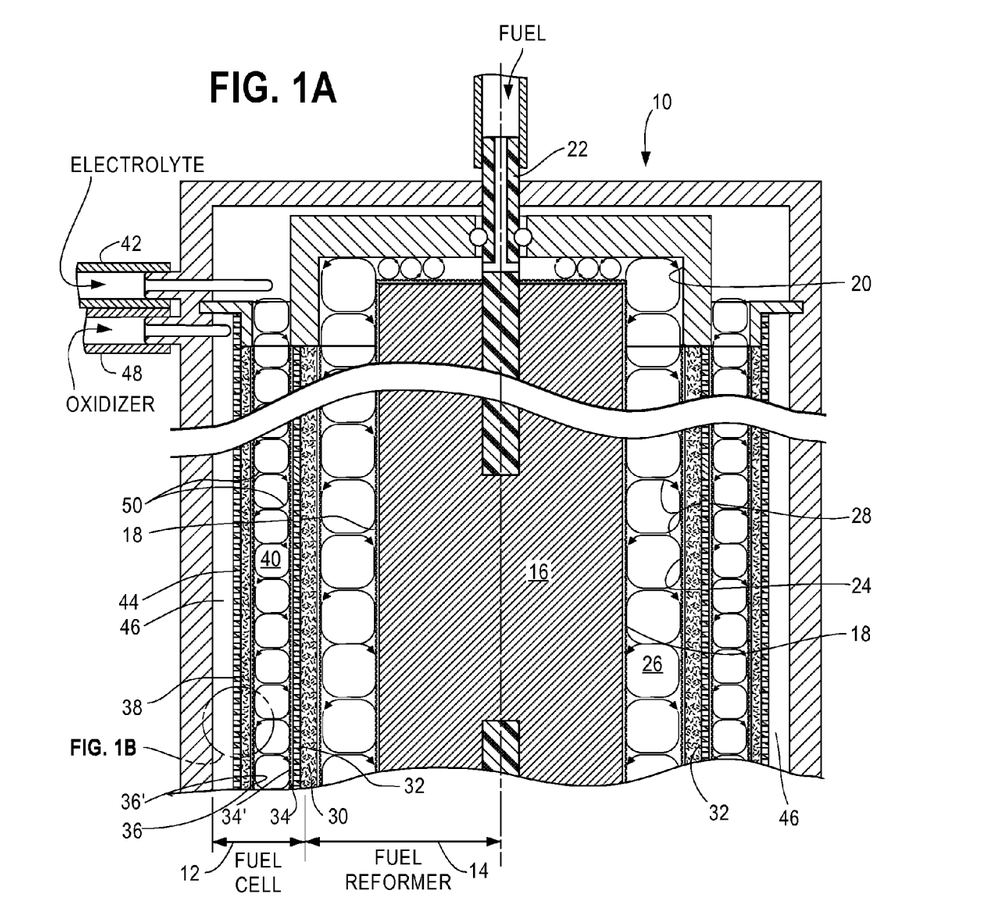
FIG. 1A is a fragmentary, cross-sectional view of an electrochemical cell showing a preferred embodiment as a fuel cell.
Figure 1B:
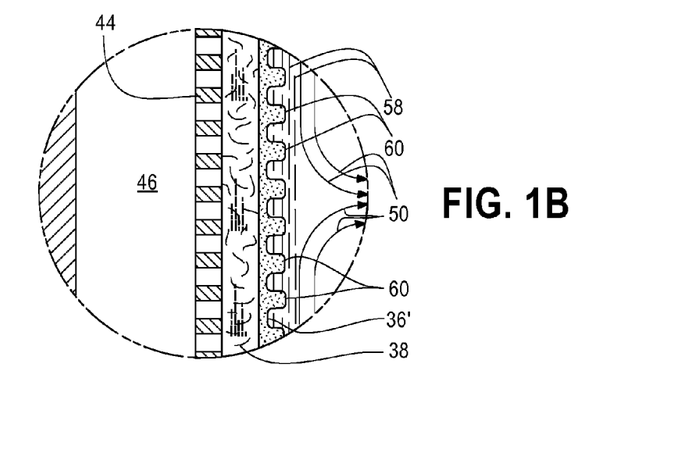
FIG. 1B is a magnified view of a portion of FIG. 1A showing a portion of the cell's cathode electrode.

FIG. 1A and FIG. 1B are a cross-sectional views of essential features of a preferred embodiment of an electrochemical cell 10 of this invention configured as a combination fuel cell 12 and fuel reformer 14. The reformer 14, located within the fuel cell 12, extracts $H_2$ gas from fuels, such as methane mixed with steam. The $H_2$ gas is subsequently used for powering the fuel cell portion 12 that converts $H_2$ and an oxidizer (e.g. $O_2$) into electrical energy and water. Extraction of $H_2$ in such an electrochemical cell is known as direct internal reforming (DIR) of fuel.

Reformer 14 comprises a fixed cylinder 16 having a porous reformer inner catalytic surface 18 on its impervious outer wall. Cylinder 16 is fixed to the frame of cell 10 by means not shown. Cylinder 16 may contain a heater (not shown) for providing thermal energy to the reformer's 14 endothermic fuel reforming chemical reaction. More commonly, heat is provided by the exothermic reaction of the fuel cell 12.

Cylinder 16 is located within a reformer/fuel cell hollow cylinder 20 that rotates around fuel input tube 22. The inner wall of cylinder 20 has a porous reformer outer catalytic surface 24. Reformer catalytic surfaces 18 and 24 define a reformer chamber 26 that is in fluid communication with fuel input tube 22.

The reformer 14 is activated by pumping a fuel (from a source not shown), such as a mixture of gaseous methane and steam, through the fuel input tube 22 and causing the cylinder 20 to rotate at a rate adequate to generate TVF 28 in the reformer chamber 26. Reforming will generate $H_2$, which will penetrate the reformer outer catalytic surface 24 while $CO_2$ may be carried out of the reformer chamber 26 through a vent that is not shown or allowed to pass through surface 24. Other fuels (e.g. methanol, ethanol and sodium borohydride ($\alpha NaBH_4$)) that can be reformed to extract hydrogen may also be used.

$H_2$ that penetrates the reformer outer catalytic surface 24 continues through reformer rotational cylinder porous wall 30 and passes into fuel cell 12. The $H_2$, which is a reducing agent or reductant, enters the fuel cell 12 by penetrating through an inner or first porous metal surface 32, which can be $H_2$-selective palladium, and then into porous anode electrode 34. Multiple catalyst particles embedded within the pores of electrode 34, as disclosed in Case C and Case D, then react with the $H_2$ entering its pores to produce $H^+$ ions at the electrode's outer or second surface layer 34'. The surface layer 34' is porous and contains catalyst. The porous metal surface 32 both supports electrode 34 and conducts heavy electrical currents from it. Means for connecting the inner porous metal surface 32 and the anode electrode 34 to an external electrical circuit (e.g. a slip ring or rotary electrical interface) are not shown. Case D discloses a multi-cell fuel cell that does not require slip rings or a rotary electrical interface between its electrodes and the external electrical circuit.

The fuel cell electrode 34 is within fuel cell 12 porous cathode electrode 36 that is secured to the inner wall of fixed porous cylinder 38, which cannot rotate. A fuel cell fluid electrolyte chamber 40 is defined by space between the fuel cell's anode electrode 34 and cathode electrode 36 that, in this embodiment, has substantially parallel surface layers 34' and 36' that are separated to permit anode electrode 34 to rotate within cathode electrode 36. The surface layer 36' is the cathode electrode's 36 inner surface layer, is porous and contains catalyst. The electrolyte chamber 40 is in fluid communication with electrolyte input tube 42 that can be connected to a source (not shown) of electrolyte. Means for draining contents of any unreacted hydrogen or oxygen gas in the electrolyte chamber 40 are not shown. The cathode electrode 36 has an outer or first porous metal surface 44 that supports the cathode electrode 36 and conducts heavy electrical currents from it. Means for connecting the cathode electrode 36 to an external electrical circuit also are not shown.

Reformer 14 cylinders 16 and 20 and fuel cell 12 electrodes 34 and 36 are shown in the drawings as right-circular and coaxial; however, these attributes are not a requirement and other cylinder-like geometries (e.g. elliptical, conical, hyperbolic, irregular, different axes) may be employed so long as the surfaces do not come in contact. Also, it is practical to build a cell where the inner cylinder is fixed and the outer cylinder rotates or both cylinders rotate at different speeds or directions. All that is required is that one of the cylinders rotates relative to the other so that there is a rotational speed difference between the cylinders.

Generally, electrodes 34 and 36 and catalytic fuel reforming surfaces 18 and 24 are coextensive, both circumferentially and axially. The gaps between facing surfaces in chambers 26 and 40 may vary somewhat by imparting a slightly cylindrical-conical shape, not shown, to either or both surfaces in order to establish a uniform pressure in axially flowing fluid contained within these chambers 40 and 46.

The outer or first porous metal surface 44 of the fuel cell porous cylinder 38 is in fluid communication with oxidizer manifold 46. The oxidizer manifold is connected to oxidizer input tube 48 that can be connected to an oxidizer source (not shown). Preferred oxidizers include purified, $O_2$, air or a liquid such as hydrogen peroxide, depending on choice of fuel. The oxidizer penetrates through an outer or first porous metal surface 44 and then into porous anode electrode 36. Multiple catalyst particles embedded within the pores of the electrode 36, disclosed in Case C and Case D, then react with the oxidizer entering its pores to produce $OH^-$ ions at the electrode's inner or second surface layer 36'.

The electrochemical cell 10 is operated to produce electricity for transmission to an external load (not shown) by a process comprising:
1. Pumping a reformable reductant, such as hydrocarbon fuel and steam, through fuel input tube 22 into reformer chamber 26;
2. Pumping electrolyte through electrolyte input tube 42 into electrolyte chamber 40;
3. Pumping an oxidizer, such as—but not limited to, $O_2$, hydrogen peroxide, air or $O_2$ extracted from air, through oxidizer input tube 48 into oxidizer manifold 46 and through the catalyzed reaction zone of electrode 36 so that the oxygen component is largely converted to $O^=$ or $OH^-$ ions that a) can enter electrolyte chamber 40 or b) either one of these ions can combine with $H^+$ ions to form water that can enter electrolyte chamber 40;
4. Rotating reformer hollow cylinder 20 at a rate or rotation adequate to cause—
   i. fuel reformer 14 Taylor Vortex Flows 28 in reformer chamber 26,
   ii. fuel cell 12 Taylor Vortex Flows 50 in the fuel cell electrolyte chamber 40, and
   iii. $H_2$ from the fuel, and $CO_2$ produced by the reforming process not otherwise purged from the reformer chamber 26, to pass through the catalyzed reaction zone of electrode 34 with sufficient residence time to produce $H^+$ ions from essentially all the reformed $H_2$ fuel so that the $H^+$ ions either pass into the electrolyte chamber 40 or combine with $OH^-$ ions to form water;
5. Venting any residual $CO_2$ and unreformed fuel from the reformer chamber 26; and
6. Draining electrolyte containing $H_2O$ and any $CO_2$ gas created by the reformer's 14 and fuel cell's 12 chemical reactions, as well as any unreacted gas passing through electrode 36, from the electrolyte chamber 40.

Creation of the TVF 50 in the fuel cell 12 electrolyte chamber 40 provides four significant operational advantages, namely:

Eliminating need for PEM to prevent fuel/oxidizer crossover;

Creating exceptionally high-shear-rate laminar electrolyte CCF at anode electrode 34 and cathode electrode 36 surfaces to facilitate chemical reaction mass transport coupled with accelerated ionic transport between electrodes, all cooperating to promote faster chemical reactions and high electrical current densities;

Scavenging reaction byproducts (e.g. water) with electrolyte circulation; and

Providing direct access of trans-electrode fuel and oxidizer to catalyst surfaces.

These four principal advantages translate into higher power and energy densities in terms of both size and weight over prior art fuel cells. TVF 28 in the reformer 14 chamber 26 enhance fuel reforming by enhancing mass transport at catalytic surfaces 18 and 24.

In every case, in accordance with the invention, fuel and electrolyte, whether or not recirculated for reuse, are contained within a chamber, 26 or 40, having at least one facing spinning surface. Rotation of the spinning cylinder 20 imparts energetic, but non-turbulent Taylor Vortex Flows 28 or 50 in the fuel or electrolyte immediately upon entry of the fluid into its respective chamber 26 or 40.

When $H_2$ is used for fuel, DIR is not required and therefore the fuel reformer 14 is not needed. If the electrolyte is alkaline, then the TVF may collect water vapor in chamber 26 and the resulting mixture can be recirculated to release or capture steam and to recover any unused fuel. However, $H_2$ can be driven directly through the anode 34 at elevated pressure and temperature to produce higher power and water, as liquid or vapor, and pass out of chamber 40 with the electrolyte.

When $H_2$ is used for fuel and the electrolyte is an acid, the fuel does not need to be purged from chamber 26 because water only appears at the cathode electrode 36 and the only fluid in chamber 26 is $H_2$.

Figure 2A:
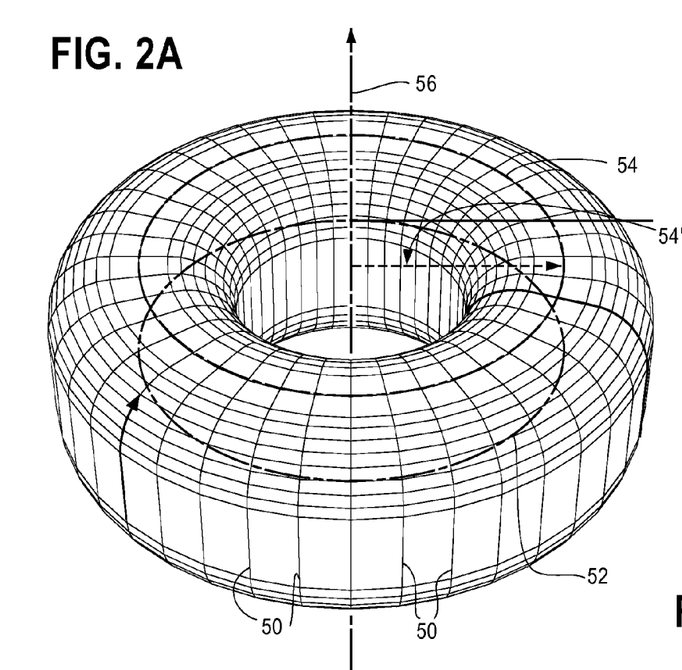
FIG. 2A, FIG. 2B, FIG. 2C and FIG. 2D are more detailed illustrations of a Taylor Vortex Flows and Circular Couette Flows in an electrochemical cell.
Figure 2B:
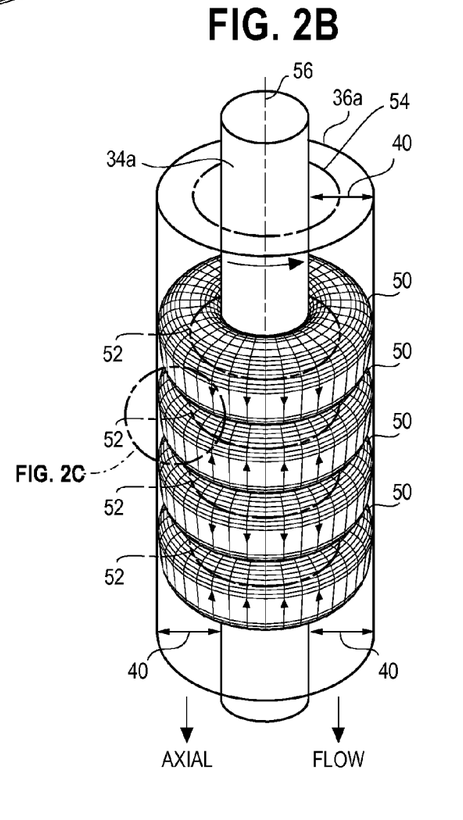
Figure 2C:
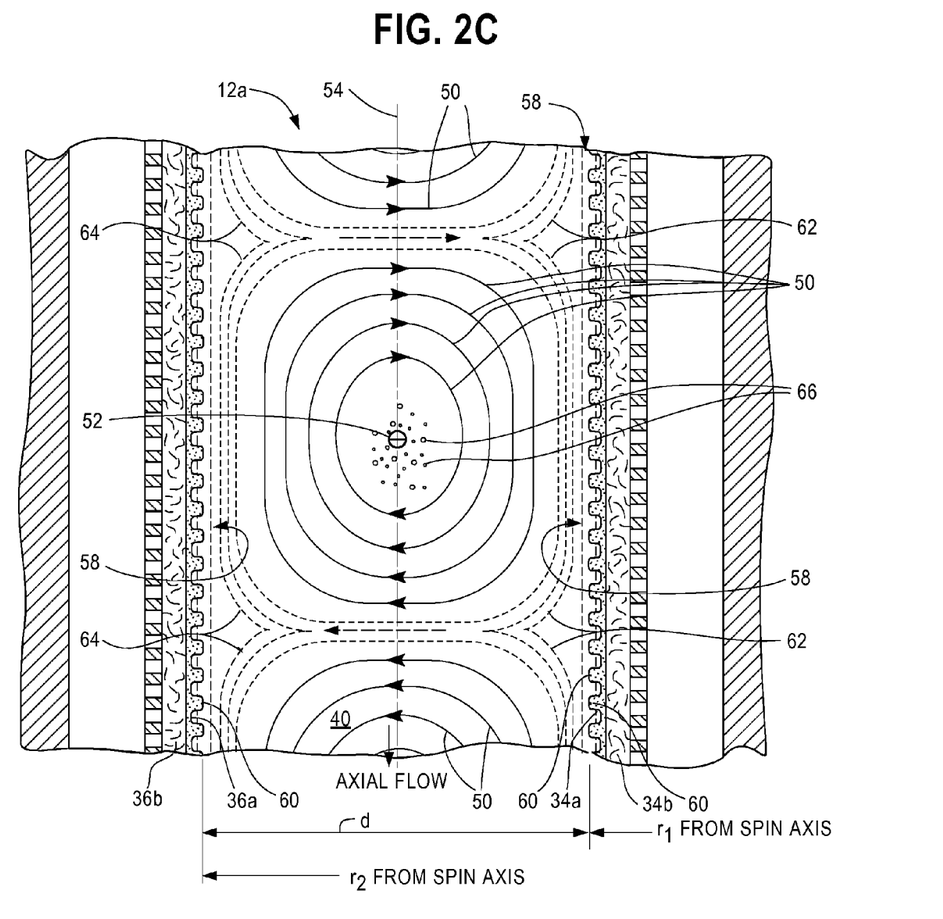
Figure 2D:
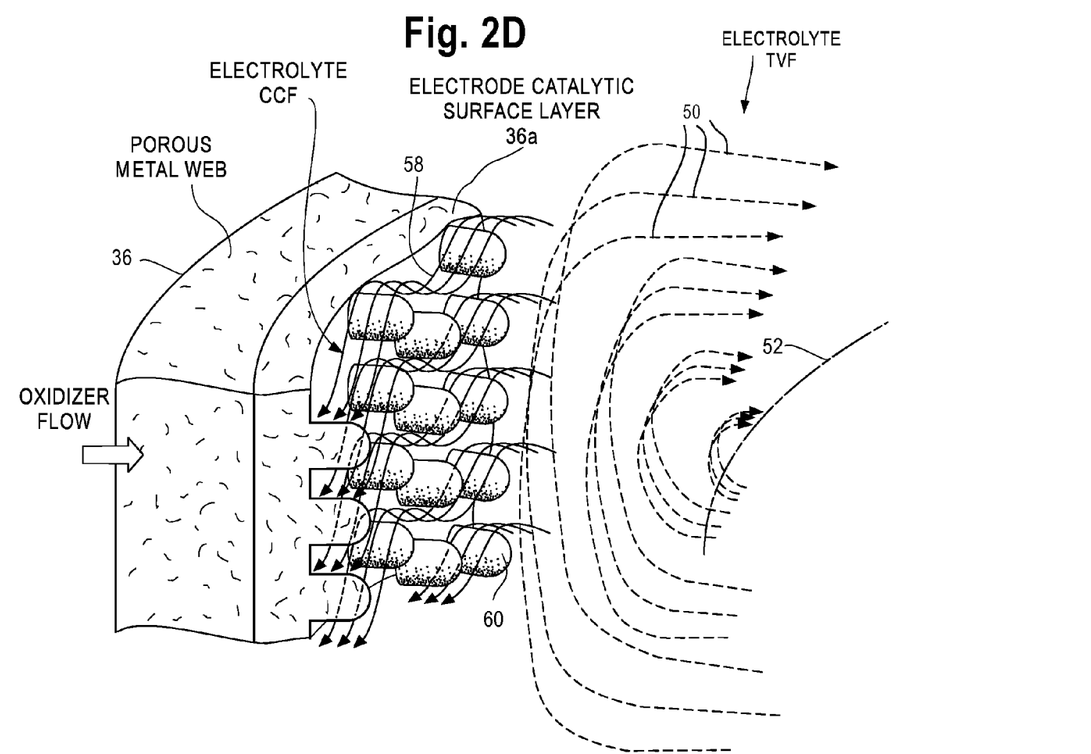

FIG. 2A, FIG. 2B, FIG. 2C and FIG. 2D are more detailed and somewhat idealized illustrations of Taylor Vortex Flows (TVF) between one set of facing active surfaces layers—such as fuel cell 12a electrode surface layers 34a and 36a. The vortex flows 50 resemble doughnuts or, more technically, tori of fluid that spin around their own axes 52. These tori 50 spin axes 52 define planes that are perpendicular to the cross-section view plane of FIG. 2C. FIG. 2D shows a torus 50 spin axis 52 in perspective. Vortex radii 54' extend from the cell's spin axis 56 to the center 54 of electrolyte chamber 40a between the respective stationary and spinning surface layers 34a and 36a.

As shown in FIG. 2B, several vortices 50 form an array that extends along the full axial length of the electrolyte chamber 40. Each vortex 50 is contra-rotating with respect to its adjacent vortex 50. Diameters of vortexes 50 are slightly less than the width of the electrolyte chamber 40 in order to accommodate CCF 58.

Of critical importance to the invention is the fact that the entire array of vortices 50 is enveloped by a high-shear-rate laminar boundary layer 58 (FIG. 2C and FIG. 2D) of spinning fluid almost fully covering each surface that encloses the array of vortices 50. Thin layers of fluid are moving with high laminar shear perpendicularly to the sectional plane of FIG. 2C. FIG. 2D provides a perspective view of the relationship between the CCF 58 and the TVF 50 rotating around the TVF axis 52. The CCF 58 are orthogonal to the TVF 50 and parallel to the TVF axis 52. The CCF 58 encompass protuberances 60 (FIG. 2D) that extend from the electrode 36 catalytic surface layer 36' into the CCF 58. A similar relationship is formed at the convex cylinder surface layer 34' (not shown in FIG. 2D).

Referring to FIG. 2C, the CCF 58 adjacent the rotating surface layer 34a move most rapidly near the catalytic surface layer 34a and least rapidly where CCF 58 transition to TVF 50 at 62, which is a small distance from surface layer 34a. Conversely, the CCF 58 are nearly static adjacent the stationary shell layer 36a and move most rapidly where the CCF transition to TV 50 at 64, which is a small distance from the surface layer 36a.

The high velocity differences of these laminar boundary layer CCF 58 and the very small distances over which they occur produce extremely high shear rates and consequently large mass transport coefficients. The invention takes further advantage of this very desirable condition by incorporating active catalytic surface layers 34' and 36' with protuberances 60 of catalytically-active material that extend into the high-shear laminar-flow streams 58 shown in FIG. 2C and FIG. 2D and disclosed in Case C and Case D. This greatly increases the amount of catalytic surface exposed to the high shear flow. This same description also applies to CCF (not shown) at fuel reformer 14 catalytic surfaces 18, 24 where they are formed in conjunction with TVF 28.

The porous catalytic surface layers 34' and 36' are made of electrically conducting filamentary or foam material supported by heavy porous metal surfaces 34b and 36b for conducting large electrical currents. The metal surfaces 34 and 36 may be easily coated with a high-molecular-weight compound (e.g. PTFE) to protect the metal from corrosive attack by or premature hydrolysis of some fuels (e.g. borohydrides) and to keep the electrolyte from penetrating past the surface layers 34a, 36a.

An important feature of the TVF is illustrated in FIG. 2C where particles and bubbles 66 are captured by TVF 50. The particles 66 are from a precipitate, including water attached to the precipitate (e.g. $NaBO_2$) and bubbles are from either electrode surface layer 34a or 36a. The particles and bubbles 66 are not in actual solution as part of the electrolyte and are therefore subject to the flow dynamics just described. They will experience high pressure gradients caused by the fluid electrolyte TVF 50. These high gradients appear in both the high-shear laminar CCF 58 and within the vortices 50. They quickly drive the particles and bubbles 66 to the centers of the nearest vortices 50 where they remain trapped.

Vortices 50 move in axial flow through the electrolyte chamber 40. The particles and bubbles 66 trapped within vortices 50 are forced out of the cell 12a along with their host vortex 50. Thus, TVF 50 constitute means for extracting unwanted contaminants 66 from the electrolyte. These unwanted contaminants 66 may include reaction precipitates, water, vapor, $CO_2$ and any gasses exiting either electrode, any of which can degrade the electrolyte. A similar process occurs in the fuel reformer 14 where pyrolytic hydrocarbon cracking utilizes TVF to prevent fouling of catalytic surfaces, as described in Case B.

Figure 3:
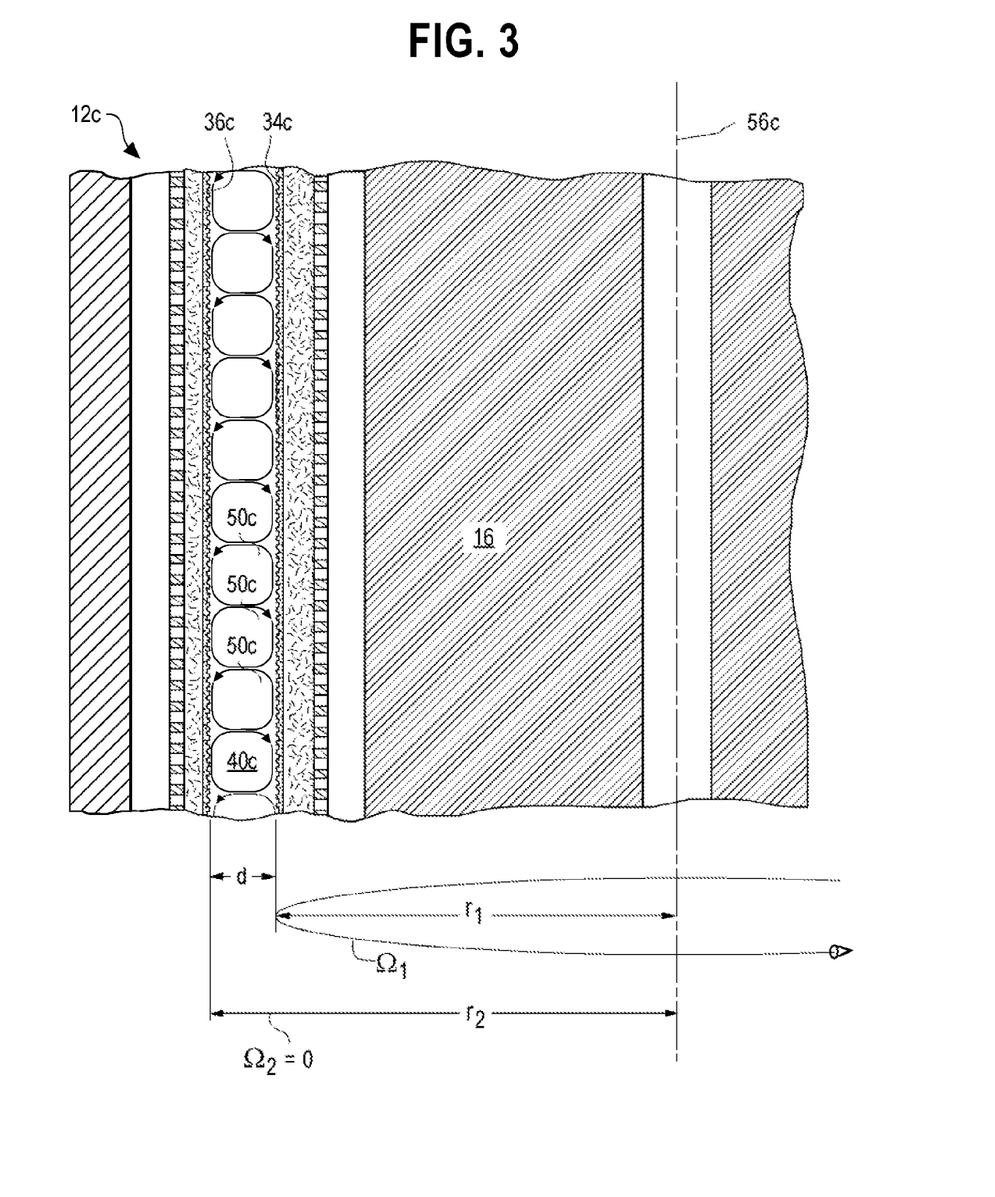
FIG. 3 is a cross-sectional view of a portion of an electrochemical cell electrolyte chamber having Taylor Vortex Flows in the electrolyte.

FIG. 3 is a cross-sectional view of a portion of an electrochemical cell 12c chamber 40c having TVF 50c in a fluid, which could be its electrolyte. One side of the chamber 40c is a cylinder-like first porous surface 34c that may or may not have catalytically active surface, at radial distance, $r_1$ from cell spin axis of rotation 56c about which first porous surface 34c is caused to spin at an angular rate, $\Omega_1$. The other side of the chamber 40b is a cylinder-like second porous surface 36c that also may or may not have catalytically active surface, at radial distance, $r_2$ from cell spin axis of rotation 56c. A gap of thickness, $d=r_2-r_1>0$ is defined between the two surfaces 34c and 36c. As used herein, the term 'gap' is synonymous with the width of a chamber such as fuel reformer 14 chamber 26 or fuel cell 12 or 12c electrolyte chambers 40 or 40c.

As derived from Lathrop, Daniel P., et al, "Transition to shear-driven turbulence in Couette-Taylor flow.", Physical Review A, vol: 46, No. 10, (Nov. 15, 1992), pp; 6390-6404, the circumferential Reynolds number, $R_c$, for fluids contained in a gap between a moving member having rotational speed $\Omega_1>0$ and a fixed member having speed $\Omega_2=0$ is defined as:

$$R_c = \{\pi(RPM)r_1 d/30\nu\} \leq 10^4 \quad \text{Equation \& Condition (1)}$$

where:
$\Omega_1 = [2\pi(RPM)/60]$ radians/second; and
$\nu$=kinematic viscosity=$\mu$(poise)/$\rho$(grams/cc.)

The condition that $R_c \leq 10^4$ is required for well-formed Taylor Vortex Flows so that fluid flow contained within the gap d be non-turbulent. The condition that these vortices exist in a form required by the invention can be written as the following lower limit for the critical Taylor number, $T_c$ at which the characteristic vortices begin to form:

$$T_c = 2r_1(\pi/30)^2 d^3 (RPM)^2/\nu^2 (2+\{d/r_1\}) \geq 1{,}715$$
$$(f\{R_a\}) \quad \text{Equation \& Condition (2)}$$

where:
$f\{R_a\}$ is a function derived in Chandrasekhar, S., "The hydrodynamic stability of viscid flow between coaxial cylinders", Proc. Nat. Acad. Sci., vol: 46, No. 1, (1960) pp. 141-3 and reported to be experimentally verified in R. J. Donnelly and D. Fultz, "Experiments On The Stability Of Spiral Flow Between Rotating Cylinders", ibid. No. 8, pp; 1150-1154 [see their FIG. 1 on page 1153]; and $R_a$=the axial Reynolds number for Poiseuille-type axial recirculation flow through the gap, d.

A convenient way to express $R_a$ is:

$$R_a = (dL/v)(\dot{U}/U) \quad \text{Equation (3)}$$

where:
L is the axial length of the active porous member(s),
U is the volume of fluid in the gap of thickness, d,
$\dot{U}$ is the volumetric rate of axial flow from one end of the gap to the other, and
$\dot{U}/U$ is the rate of exchange of all the volume in the gap.

A convenient numerical expression for $f\{R_a\}$ is:

$$f\{R_a\} = 1.0 + (0.297)(\log_{10} R_a)^{4.04342} \text{ for } R_a > 1.0$$

$$f\{R_a\} = 1.0 \text{ for } 0 \leq R_a \leq 1.0$$

The two Conditions, (1) and (2), defined above should be met for optimum operation. They do not restrict design parameters to specific values; but rather, permit a fairly broad range of permitted values that can be chosen to satisfy other desirable conditions.

For example, it may be desirable to limit torque driving the spinning member so that it does not consume an appreciable fraction of the power generated. The thickness of the laminar high shear boundary layer on the facing surfaces of each of the porous members can be chosen for optimal mass transport characteristics. The equations that define these properties are:

Torque, T was defined in Lathrop, Daniel P. et al, "Transition to shear-driven turbulence in Couette-Taylor flow.", Physical Review A, vol: 46, No. 10, (15 Nov. 1992), pp; 6390-6404 as:

$$T = (0.202)\rho v^2 L (r_1 R_c/d)^{5/3} \quad \text{Equation (4)}$$

Therefore, the power expended in spinning the inner member per cm² of surface area is:

$$W = (7.834)\rho v^{1/3} (r_0)^{7/3} (\text{RPM})^{8/3} \times 10^{-12} \text{ Watts/cm}^2 \quad \text{Equation (5)}$$

The respective stable boundary layer thicknesses, $\delta_1$ and $\delta_2$ are:

$$\delta_1 = (28.45)(v/\text{RPM})^{2/3} (r_1)^{-1/3} \quad \text{Equation (6a)}$$

$$\delta_2 = (1.29)(1+[d/r_1])\delta_1 \quad \text{Equation (6b)}$$

Neither the power expended, W, nor the boundary layer thicknesses, $\delta_1$ nor $\delta_2$, depend on the gap dimension, d, between the two porous surfaces. $\delta_2$ is a function of $r_2$. The nominal shear rate without TVF would be $\Omega_1 r_1/d$; but, the shear rate with TVF, for $\Omega_2=0$, is $\Omega_1 r_1/\delta_1$ and $\Omega_1 r_2/\delta_2$ for the two surfaces, respectively.

Thus, shear at each surface is multiplied by factors of:

$$d/\delta_1 = 0.03515(v/\text{RPM})^{-2/3} (r_1)^{1/3} d; \text{ and}$$

$$d/\delta_2 = 0.775(d/\delta_1)/(1+d/r_1).$$

If d is small compared to $r_1$, then stable laminar shear at the outer stationary surface is only slightly less than at the spinning one.

Figure 4:
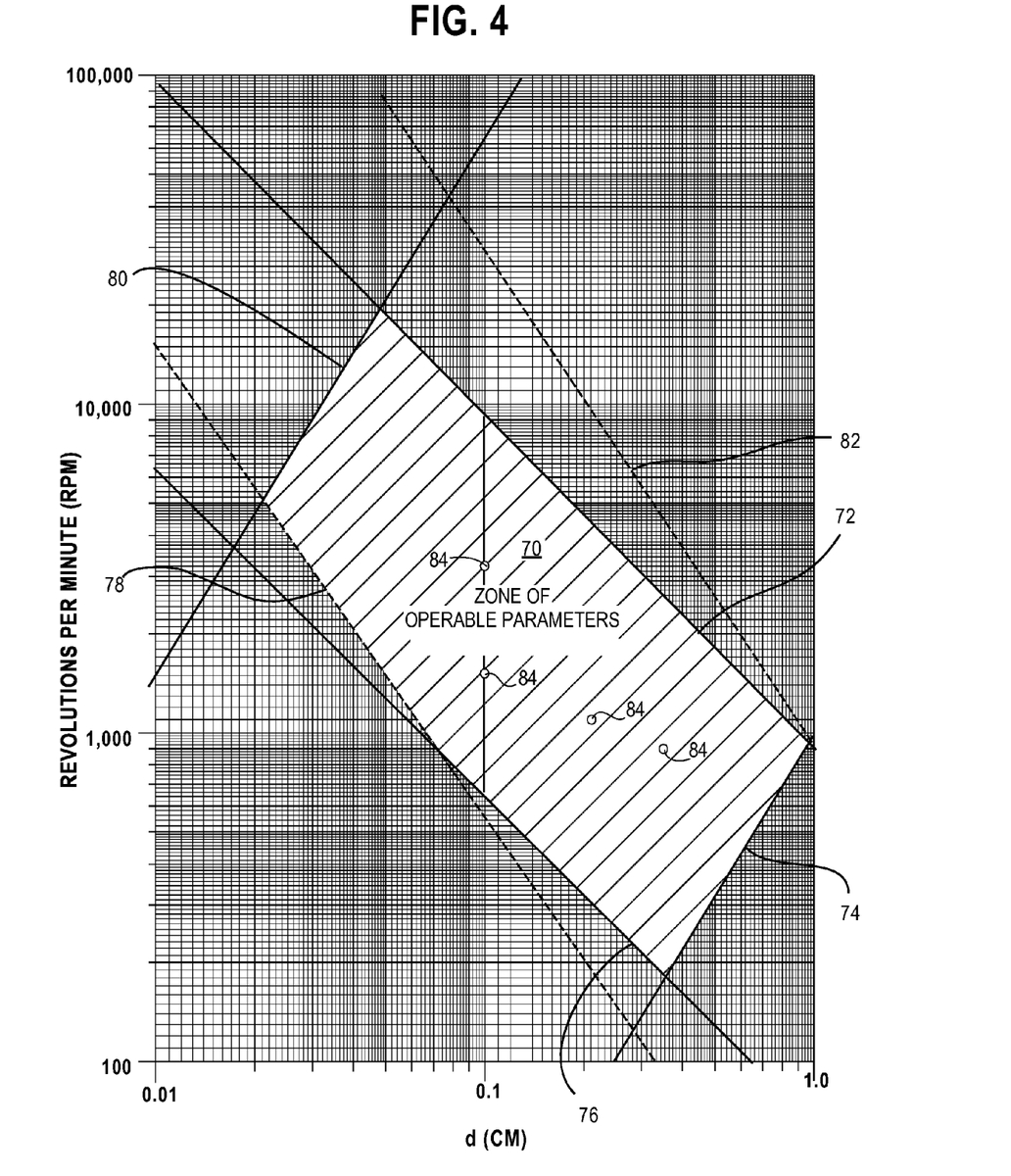
FIG. 4 is a log-log graph of Revolutions Per Minute (RPM) as a function of gap width, d, for a range or zone of operable conditions.

FIG. 4 is a log-log graph of Revolutions Per Minute (RPM) as a function of gap width, d, for various operating conditions. A Zone of Operable Parameters 70 is bounded by the following six conditions for $0.0067 \leq d/r_1 \leq 1.0$ shown as plot lines:

72—$R_c \leq 10^4$ and $r_1 \geq 1$ cm;
74—$R_c \leq 10^4$ and $r_1 \geq 3$ cm (0.05 watt/cm²);
76—$R_c \geq 2000$ and $r_1 \geq 3$ cm;
78—$R_c \geq 2000$ and $r_1 \leq 3$ cm;
80—$R_c \geq 2000$ and $r_1 \geq 3$ cm (0.05 watt/cm²); and
82—$T_c \leq 10^4$ and $r_1 \geq 1$ cm.

Coordinates of typical operating values are shown as circles 84 in the Zone 70.

U.S. Pat. No. 5,783,085 awarded for my invention of a Blood Fractionation Method discloses a process for separating plasma from whole blood with TVF. It describes the nature of the vortices and the boundary layer thicknesses $\delta_1$ and $\delta_2$, defined by Equations 6a & 6b, that envelop them and as illustrated in FIGS. 2A, 2B, 2C and 2D.

My '085 blood plasma collection machine is used to remove undesirable suspended particulates from a fluid. The machine incorporates an inner spinning membrane filter to pass selectively fluid component to be separated from a particulate suspension without having particulates plug pores in the membrane.

A vortex will act on any particulate discontinuity with a pressure gradient that drives the particle to the low pressure center of the vortex axis. This occurs whether the particle is a buoyant bubble or denser component, such as particles and bubbles 64 of FIG. 2C. This is a feature that is especially useful for trapping carbon particles being discharged from the hydrogen cracking pyrolysis in the fuel reformer of Case B.

Ions, on the other hand, are in solution and move hydrodynamically with the fluid or are driven by concentration differences through diffusion accelerated by shear forces. In the case of membrane filtration of suspensions, some particles will be forced against the membrane into the boundary layer which is often referred to as concentration polarization. Although the liquid component is trying to drag particles into and through the pores of the membrane, the extremely high shear rate, referred to above, creates what amounts to a fluidized bed of relatively, but not totally, compacted particles through which the liquid passes.

The maximum rate of liquid filtration (absent fully compacting the polarization layer that would drive the particles into and through the pores) is a linear function of the boundary layer shear rate. The reason membrane filtration of suspensions is so effective with TVF is due to that amplified boundary layer shear rate.

$H^+$ and $OH^-$ ions are carried convectively by TVF from one electrode to the other in a fuel cell 12, or 12a at a prodigious rate that is far greater than could ever be achieved in a solid polymer PEM or other stationary electrolyte. Once they have arrived near an electrode (e.g. 34 or 36), they are subjected to exceptionally energetic shear in a laminar CCF 58 covering the electrode which, for most common electrolyte liquids, will be shown to be somewhat thinner than solid membranes or an otherwise stationary electrolyte.

It is this diffusion that transports ions and reaction products to and from the surface of the catalyst. Because protuberances 60 of catalyst-bearing, porous electrode 36 material, illustrated in FIG. 1B, FIG. 2C and FIG. 2D, extend into the laminar flow layer 58, ions have both a shorter path to travel and a faster diffusion rate. The diffusion rate increases rapidly as a function of shear stress in a viscous fluid.

Electrolyte is able to penetrate deeper into the catalyst invested pore bed without flooding it by virtue of its flow profile around and over the protuberances 60 and flow and capillary pressure into their meso- and micro-pores, respectively. Neither convective transport nor accelerated diffusion in combination with higher effective catalyst loading per unit electrode interface area is possible with prior art static electrolyte systems or chemical reaction vessels. Some numerical examples are now described.

In cases where acid or alkaline electrolytes will probably be most productively employed, the kinematic viscosity and specific gravity for them will be on the order of $10^{-2}$ stoke and about 1.5, respectively, at 100° to 200° C. Gasses such as $CO_2$, methane, propane and air at 500 to 600° C. and 10 bar (150 psi) have corresponding kinematic viscosities on the order of 0.06 to 0.08 stoke. The latter values will apply to parametric designs relating to examples of pyrolytic fuel cracking and steam reforming.

Methane, $CH_4$, propane, $C_3H_8$, methanol, $CH_3OH$, and ethanol, $C_2H_5OH$ are among the more suitable choices for fuels because they have the highest ratios of hydrogen to carbon, are widely available and are simple molecules to break. There are other hydrocarbons that have similar kinematic viscosity properties.

In the case of liquid electrolyte fuel cells, engineering procedure starts with calculation of a reasonable value for the parameters of Equation 5 to limit power burden to a small fraction of power generated. The density of gasses used in reaction vessels is low and therefore power burden should not be critical.

Construction of TVF electrochemical cells 10 requires mathematical analysis of physical design and operable parameters to select useful values that can be applied to a specific design or embodiment. When the fluid in question is liquid there is a special condition that needs to be imposed, namely, that the power required to spin the interior member not be too great a fraction of the power produced. Applying this condition to typical electrolytes used in fuel cells (e.g. 12) and choosing a reasonable range of spinning member diameters (e.g. $r_1$ and $r_2$ of FIG. 3) will yield an acceptable design and values within a 'Zone of Operable Parameters' 70 of FIG. 4 where RPM is plotted on log-log axes against gap width, d.

Using the stated physical properties, FIG. 4 displays logarithmic plots of Equation 5 for rotational power decrement of 0.05 watt/cm² used to spin the rotating element (e.g. fuel reformer 14 rotating cylinder 20 of FIG. 1A). This is less than 1% of an expected power density of 5 to 10 watts/cm² in a TVF fuel cell. By comparison, conventional fuel cells produce only 0.5 to 1.0 watt/cm².

The 'Zone of Operable Parameters' area 70 of FIG. 4 covers a range of non-turbulent Reynolds numbers, $R_c$, from 2000 to $10^4$ and values of spinner radius (e.g. $r_1$ in FIG. 3) from about 1 cm to 3 cm. The range of permissible values of gap width, d, in relation to RPM lies between these plot lines 82, 72, 76 and 78. In addition, (Conditions 1 & 2) are shown on the same graph as plot lines 74 and 80. Together, these plot lines form a central 'Zone of Operable Parameters' 70.

For example, one might want to limit the motor speeds to 1800 or 3600 RPM, which are standard 60 Hz electric motor speeds in North America. The range of suitable values for gap, d, appears in FIG. 4 to be about 0.05 to 0.15 cm; but, a wider gap dimension, $d=r_2-r_1$, facilitates higher critical Taylor number, $T_c$, and consequently higher allowed recirculation rates in accordance with the combined application of Equations 2 & 3. This is particularly useful in one configuration that removes water product with the recirculated electrolyte as to be described below. The 'Zone of Operable Parameters' 70 is understood to indicate practical; but not necessarily exclusive, system design parametric values within which useful TVF may be obtained without turbulence.

The plot lines 78 and 82 in FIG. 4 bound minimum critical Taylor numbers, $T_c$, which slightly further limit the operable range of values. The boundary layer thicknesses for typical design parameters such as d=0.1 cm and $r_1$=2 cm. are next calculated.

The following table provides some representative values:

| Motor Speed (RPM) | $R_c$ | $\delta_1$ (mm) | Shear Multiplier |
|---|---|---|---|
| 1800 | 3770 | 0.071 | 14.12 |
| 3600 | 7540 | 0.045 | 22.40 |

The range of boundary layer thickness values are somewhat less than, but nearly the same as, currently used in PEM solid polymer membranes. A major difference is the rate of shear-amplified diffusion compared to polymer interstitial transport.

Typical laminar boundary layer shear for a TVF electrochemical cell 10 results in a "Shear Multiplier", as shown above, of as much as 15 to over 20-times the nominal value of $r_1\Omega_1/d$ for a conventional cell. For a TVF fuel cell 12 using liquid electrolyte, the value of $1/\nu$ will be on the order of 100 sec/cm² and gap, d, in the range of about 0.1 cm. $R_a$ will be roughly 10 times the product of the length of a chamber such as 40 and volumetric exchange rate. If that product is on the order of 10 or 20 (e.g., a meter length can change volume every 5 to 10 seconds, etc.), then it is possible to hold $R_a$ to 200 or less so that a value of $T_c > 10^4$ will be sufficient in nearly all cases to ensure the establishment of effective TVF.

For fuel cell spin rates used in the examples, the Taylor number, $T_c$, is so far above a critical value that it is not necessary to restrict the volumetric recirculation rate as dictated by Equation 3. The volumetric recirculation rate will ultimately be determined by the molar rate of water production or reaction product gas load that needs to be extracted from the cell and exhausted from a separate chamber as steam and gas.

The boundaries of the Zone 70 also define several limiting conditions. For example, there are no useful designs for gap widths d<0.02 cm or d>1.0 cm or for spin rates $\Omega$<200 RPM or $\Omega$>20,000. Zone 70 displays practical values for a gap width d=0.1 cm. and 1800≦RPM≦3600. Larger gaps on the order of 0.2≦d≦0.3 cm. will require spin rates $\Omega \approx 1,000$ rpm.

For the normalized parameter, $0.0067 \leq d/r_1 \leq 1.0$, spinner diameters should be in the range of $1 \leq r_1 \leq 6$ cm. Smaller or larger diameters will only have a small effect on the stated ranges and are unlikely to be preferred in most fuel cell 12 applications.

Details of preferred catalytic surface layers (e.g. 34' and 36') surface structures are provided in Case C and Case D. Protuberances (e.g. 60 on the electrode surface layer 36' as shown in FIG. 1B, FIG. 2C and FIG. 2D) should reach about half, to at most three-quarters, of the way into the laminar shear layer; but, not into the vortices 50 where they would be subjected to excessive viscous drag and consequent material deterioration or disruption of TVF. That layer does not exceed 0.005 cm. Therefore, the protuberances 60 should have a net height of about 0.00251 cm.

A plane geometric calculation shows that if ř is the radius of an idealized cylindrical shaped protuberance; then locating the protuberances 60 on the electrode surface layer 36' in a typical hexagonal array on centers spaced approximately 2.5ř apart will cover approximately one-half the electrode surface layer 36' area with the protuberances 60. This is explained in greater detail below and in Case C and Case D.

If the height of the cylindrical portion is 2ř to 4ř and is capped by a hemispherical dome, then the total external surface area of the projection is in the range of 6 to 10 πř². Because the area of the portion of surface covered by the projection is $\pi r^2$, the area multiplier for half the area is simply 6 to 10 and the net area multipliers are 3.5 to 5.5 for an average projected area of 4.5 times the face area.

With a net height of about 4 times the radius or 0.0025 cm, the projections 88 have diameters of about 12.5 µm and are spaced on centers 15.625 µm apart. The electrode 36 surface will have an appearance and feel of 1000 to 1500 grit abrasive paper of a type used to polish stone.

Figure 5:
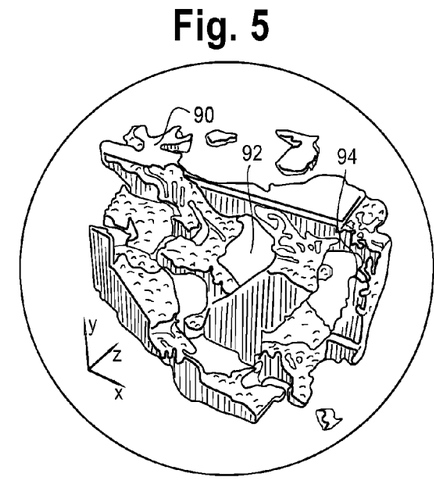
FIG. 5 is a computer-simulated view of a catalytic surface.

FIG. 5 is a drawing made from a computer-simulated view of a catalytic surface (e.g. 18, 24, 34, 36) fabricated from nanoporous metal foam or scaffold 90. The view appeared as FIG. 4 of Pugh et al, "Formation of nanoporous platinum by selective dissolution of Cu from $Cu_{0.75}N_{0.25}$", J. Material Research, Vol. 18, No. 1, January 2003, pages 216-221. Coordinate vectors x, y, z are provided as a reference frame. The view covers a volume measuring 14×14×7 nm. Pugh et al used 0.28 nm pixel spacing in calculating their image, which is the atomic radius of a Pt atom.

Pugh et al were able to produce isotropic 3-dimensional open-pore-structure foam with 3.4 nm pores 92 surrounded by smaller diameter scaffold struts 94 (called "ligaments" by Pugh et al). Pugh et al estimated sizes by "taking chord length measurements on the image".

Using the metal alloy face-centered-cubic structural geometry described by Pugh et al and by others (e.g., Erlebacher, J., "An Atomistic Description of Dealloying—Porosity Evolution, the Critical Potential and Rate-Limiting Behavior", J. Electrochemical Society, Vol. 151, No. 10, 2004, pages C614-C626); the approximate relationship of open pore fraction, $\rho_v$, to the chord length, lc and diameter, D in Pugh et al is given by:

$$(1-\rho_v)=(0.757\pi x^2+x^3)/(1+x)^3$$

where:

x=D/lc, and (D+lc)=nominal pore size

The higher power term cannot be ignored when D is a substantial fraction of lc. The stated pore volume fraction is 0.75 based upon a starting Pt alloy concentration of 25% so that the chord diameter would calculate to approximately 2.0 nm for the smallest pore. The D/lc ratio is 0.58, which is a function of foam sponge geometry and pore volume fraction; but, does not vary for larger pore size results reported by Pugh et al. These dimensions can be increased by varying process parameters, such as de-alloying times, temperatures, applied voltages, solvents and alloy compositions.

The metal foam 90 of FIG. 5 comprises a nanoporous metal scaffold 90 having open and permeable in 3-dimensions pores 92 of 5 to 15 nm contained by the scaffold struts 94, which have smaller dimensions. Metal or metal alloy or organic catalyst particles (not shown) decorate the scaffold struts 94. The catalyst particles are of about 2 to 7 nm in size for best surface area dispersion and catalyst activity. For fuel cells 12 and fuel reformers 14, metals selected from the Platinum Metals Group (e.g. Pt, Ru) and their alloys are preferred catalyst materials for the particles and the foam scaffold 90.

Pugh et al described their metal foam pictured in their FIG. 4 as an open pore structure having 3.4 nm or larger pores 92 and comprising comparably sized Pt struts 94. Using x=0.58 and D=2 nm as calculated above, the ratio of exposed active catalyst area to projected electrode surface area is:

$$[3\pi x/(1+x)^2](T/P_D)$$

where:

$P_D$=(D+lc)=nominal pore 92 diameter,

T=depth thickness of the electrolyte flow permeating electrode surface layers 18, 24, 34', 36' and D=diameter of the nanostruts 94 forming the pores 92.

In a 100 micron thick electrode having 75% open pore volume, 3.4 nm pores 92 and 2.0 nm diameter struts 94, the area multiplication factor is 41,000 $cm^2$ of exposed reactive electrode surface area per $cm^2$ of projected electrode.

By comparison, the formula for an equivalent packing volume of spherical particles is $6(1-\rho_v)(T/D)$. Thus, the Pugh et al foam 90 has an exposed surface area comparable to spherical particles with equivalent Pt volume loading. While supported particles normally lose about half of their exposed area because of attachment requirements, the porous foam struts 94 are fully exposed to reaction kinetics. Consequently, bare nanoporous foam 90 is at least as effective as a catalyst dispersion mechanism as supported particles of equivalent dimension; but, is a more stable structure.

Metal foam 90, with an open pore volume of 75%, is more effective for the mass transport exposure of catalyst to TVF and CCF than supported catalyst particles. Even with pore 92 diameters of 25 nm, the active catalyst area ratio for a 100 micron thick catalyst layer is an unprecedented 8,750 $cm^2$ to 1 $cm^2$ of projected electrode area.

For anode surface layers 34', the Pt nanoporous metal foam 90 can be loaded with Ru particles made from a colloidal suspension of the appropriate salts as taught in the prior art. The foam 90, containing Ru particles, can be heat-treated so that the particles are absorbed into the Pt struts 94 to form a foam of 50:50 Pt—Ru alloy. Alternatively, a 5 to 15 nm Pt porous foam 90 with 50:50 Pt—Ru particles of 2 to 5 nm size can be thermally attached by heat sputtering to the struts 94. Pure Pt will work for oxygen cathodes.

These catalyst surface layers 14, 20, 34', 36' of nanoporous foam or scaffolds 90 are excellent electrical conductors and can be deposited on or secured to micro-porous copper substrates that will provide substantial strength and electrical conductivity for the catalyst surface layers 14, 20, 34', 36'. The copper substrates may be easily coated with a high-molecular-weight compound, such as a polymer (e.g. PTFE), to protect the copper from corrosive attack by or premature hydrolysis of some fuels (e.g. borohydrides) and to keep the electrolyte from penetrating past the surface layers 14, 20, 34', 36'.

The electrode surface layers 14, 20, 34', 36' comprising catalytic metal foam 90 can be operated safely in alkaline environment at elevated temperatures in the range of 250 to 350° C. and at elevated pressures to achieve accelerated catalytic performance. The same structure and process can be used to build nanoporous catalytic layers from other metal foams 90, such as gold, copper, tungsten and nickel.

The catalyst particles need a fluid or an electrolyte to wet, but not flood, them in a thin envelope of fluid or electrolyte so that chemical reactants can diffuse into the molecular fluid or electrolyte coating and react at the catalyst surfaces. For direct reaction fuel cells, the boundary layer thicknesses for typical design parameters are about 0.05 mm, which are somewhat less than the thickness of proton exchange solid polymer membranes. However, one difference in current density is due to the rate of shear-amplified diffusion in a TVF cell compared to polymer interstitial transport. Typical laminar boundary layer shear rate in a DRFC with TVF is as much as 15 to 20 times the nominal flow rate in a proton exchange membrane fuel cell (PEMFC).

Conventional electrodes used in current PEM fuel cells contain 2 to 5 nm Pt particles attached to approximately 40 nm diameter carbon spheres. These spheres tend to aggregate into 800 nm diameter clumps that are attached to porous carbon filament webs that conduct electrons to bi-polar plates. If these same catalyst particles and clumps are held in the nanoporous foam 90, then the longest or deepest shear-enhanced diffusion path for ions or other reactants to reach active catalyst is about 400 nm. By comparison, a typical electrode applied to a PEM, which transports ions by dragging water molecules through its polymer chain interstices, has a depth of about 30,000 nm.

When gas is disposed in a chamber (e.g. 40) between rotating and stationary surfaces (e.g. 34 and 36), several criteria that limit the range of design parameters for liquids, such as acid and alkaline electrolytes, are much easier to meet. While kinematic viscosities for methane, air and $CO_2$ are nearly an order of magnitude larger than for the liquids, corresponding specific gravities are somewhat more than two orders of magnitude lower. Since the expended rotational power density varies as $\rho v^{1/3}$, power required to spin the rotating member (e.g. 34) is very much less and can be ignored.

If there is a reason to construct a miniature device with $r_1 \approx 1$ cm and $d \approx 0.1$ cm, then the criteria for establishing TVF would be met for RPM>1000. To ensure flows will not be turbulent, 1000<RPM<6500.

For larger devices where $r_1 \approx 5$ cm and $d \leq 1$ cm, there is no difficulty satisfying the Taylor criterion. To avoid turbulence, the RPM should be <1100.

Boundary layer thickness calculations provide an estimate of ionic conductivity through TVF between electrodes. Clearly, the convective mass transport of the vortices themselves is orders of magnitude beyond relevance and will be ignored. For purposes of this calculation, the value of ionic conductivity in siemens/cm is a primary parameter and is understood to equal (amperes/cm$^2$)/(volts/cm).

Actual performance of conventional solid-polymer PEM cell plate stacks provides ionic conductivity values that are typically (0.6)/(0.65/t) where t is the thickness of the polymer membrane. Thickness is described in prior art as $0.005 \leq t \leq 0.01$ cm. Therefore, the ionic conductivity of a PEM for H$^+$ ions must be about $4.6 \times 10^{-3}$ to $9.2 \times 10^{-3}$ siemens/cm. Values of ionic conductivity for liquid electrolytes at low viscous shear are on the order of 20 to $100 \times 10^{-3}$ siemens/cm. Given the shear stress multiple of the boundary layer as calculated above, it is clear that ionic diffusion driven by concentration gradients and linearly multiplied by shear rate at the catalyst surface is a further order of magnitude beyond typical cell electrolyte values. For these reasons, ionic conductivity can also be ignored as a limiting factor controlling ionic transport between electrode surface layers (e.g. 34' and 36') in a TVF electrochemical cell.

The ionic conductivity calculations above indicate that rate limiting reactions occur mainly within the electrode surface layers (e.g. 34' and 36'). There is a relationship of current as a function of a dimensionless ratio of reaction-time:residence-time, where reaction-time, $t_a$, is the time required for chemical components of a fluid to react with the multiple embedded catalyst particle surfaces in an electrode to form ions and residence-time, $t_r$, is the time that the fluid is in an electrode surface (34' or 36') reaction zone.

The electrical current function becomes approximately asymptotic at a maximum current when (10×reaction-time) <residence-time. When reaction-time:residence-time≈1/10, then mass transport within the electrode surface layers (e.g. 34' and 36') does not limit the rate of current producing chemistry. Means for controlling entry of a chemical into pores of an electrode so that reaction-time:residence-time<1/10 may include controls for adjusting fluid pressures in reformer chamber 26 or oxidizer manifold 46.

This criterion can be applied to a Pt-surface-catalyzed reaction as follows:

$$W_a = \rho_m \sim \gamma \cdot E_v \cdot NF(z/t_r) \qquad \text{Equation (7a)}$$

$$t_a \leq \rho_m \gamma \cdot E_v \cdot NF(z/10 \cdot W_a) \qquad \text{Condition (7b)}$$

where,
$W_a$=electrode interface watt density;
$\rho_m$=molar density of reactants, i.e., fuel and reacting ions;
$\gamma$=void fraction of the porous structure (usually about 60%);
$E_v$=voltage produced at the electrode (usually about 25% of the total at the cathode and the rest at the anode);
N=number of electrons produced in the reaction so that NF is the coulomb charge per mole of reactants,
F=Faraday constant
z=depth of the reaction zone at the interface surface of the electrode;
$t_a$=reaction time reactants require to produce ions; and
$t_r$=residence time that reactants spend in the reaction zone.

The criterion for achieving maximum current density, $I_m$, is for the time it takes for the molecules to react at the catalyst surface, $t_a$ to be no more than 10% of $t_r$. Applying characteristic values for various fuel cell types to Equation 7b, it is apparent that there is an area-multiplying benefit in the design of TVF electrode surfaces (e.g. 34' and 36'). A projected value of 10 watts/cm$^2$ is achieved with a value of $W_a$ of only 2.5 watts/cm$^2$.

Values of $\rho_m$, $E_v$, and N for the anode of a $H_2/O_2$ fuel cell, are typically, 0.035 moles/ml, 0.75 volts and 2 electrons, respectively. The value of z is half the diameter of an electrode protrusion or $6 \times 10^{-4}$ cm. The result for $t_a$ is $\leq 73$ milliseconds.

For a direct methanol or borohydride fuel cell, describe in Case D, the comparable values are 0.0275 moles/ml, 1.24 volts and, respectively, 6 or 8 electrons yielding $t_a$=360 milliseconds and 10 watts/cm$^2$ for methanol fuel cells and t, 180 milliseconds and 20 watts/cm$^2$ for borohydride fuel cells. These calculations are used to design appropriate electrode catalyzed reaction zone depths and related residence times at the anodes (e.g. 34) of these high power fuel cells.

Residence time is controlled by driving fuels and oxidants directly through their respective electrodes having selected active catalyzed reaction zone electrode thickness at a prescribed flow rate. This is only possible if the electrolyte captures and conveys reaction products out of the fuel cell and fuel reformer as provided by this invention.

For cell spin rates used in the examples, the Taylor number, $T_c$, is so far above a critical value that it is not necessary to restrict the volumetric recirculation rate as dictated by Equation 3. The volumetric recirculation rate will ultimately be determined by the molar rate of water production or reaction product gas load that needs to be extracted from the cell and exhausted from a separate chamber as steam and gas.

Conclusion

The electrochemical cells 10, fuel cells 12 and fuel reformers 14 of this invention offer electrochemical energy conversion systems far exceeding performances of prior art devices—including the long-standing 1-Ampere/cm$^2$ fuel cell electrode performance barrier of the prior art.

All patents identified in this disclosure are hereby incorporated herein by reference.

While the present disclosure has been presented above with respect to the described and illustrated embodiments of fuel cells 12 and fuel reformers 14 using TVF and CCF, it is to be understood that the disclosure is not to be limited to those alternatives and described embodiments. Accordingly, reference should be made primarily to the following claims to determine the scope of my invention.

I claim:

1. An electrochemical cell (12) used to convert chemical energy into electrical energy and containing first and second cylinder-like electrodes (34, 36) separated by a fluid electrolyte gap (d, 40) between the electrodes (34 and 36), comprising:
    a. means (34, 36) for creating Taylor Vortex Flows (50) in electrolyte in the gap; and
    b. means (50) for extracting unwanted contaminants (64) from the electrolyte.

2. An electrochemical cell (10) used for converting chemical energy into electrical energy comprising:
    a. a first electrode (36) that is—
        i. reactive with a first chemical entering its pores from its first surface (44) to produce a first ion at its second surface layer(36');
    b. a second electrode (34) that is—
        i. reactive with a second chemical entering its pores from its first surface (32) to produce a second ion at its second surface (34) having a charge different from that of the first ion, and
        ii. within the first electrode (36) so that a chamber (40) is created between the second surface layers (36' and 34') of the two electrodes (36 and 34);
    c. a fluid electrolyte in the chamber (40); and
    d. means for moving one electrode (36 or 34) with respect to the other
    electrode (34 or 36) to create flows (50) in the fluid electrolyte so as to generate a voltage across the electrodes (36, 34) that are adapted to be connected to an external electrical circuit.

3. The electrochemical cell (10) of claim 2 wherein:
Taylor Vortex Flows (50) are created in the fluid electrolyte.

4. The electrochemical cell (10) of claim 2 wherein:
Circular Couette Flows (58) are created in the fluid electrolyte.

5. The electrochemical cell (10) of claim 2 wherein:
    a. the first electrode (36) is cylinder-like and its second surface layer is its inner surface layer (36'); and
    b. the second electrode (34) is cylinder-like and its second surface layer is its outer surface layer (34') that is located substantially parallel to and within the first cylinder-like electrode (36) so as to create the chamber (40) for the electrolyte between the electrodes (36 and 34).

6. The electrochemical cell (10) of claim 2 comprising in addition:
means for controlling entry of a chemical into pores of an electrode layer (34' or 36') so that reaction-time:residence-time $(t_a/t_r) \leq 1/10$.

7. The electrochemical cell (10) of claim 2 wherein:
one chemical is a reductant and the other chemical is an oxidizer.

8. The electrochemical cell (10) of claim 4 wherein one of the electrodes (34, 36):
    a. a catalytic surface layer (34', 36'), and
    b. protuberances (60) that extend from the surface layer (34', 36') into the Circular Couette Flows (58).

9. The electrochemical cell (10) of claim 8 wherein one of the electrode catalytic surface layers (34', 36') comprises:
nanoporous metal foam(90).

10. The electrochemical cell (10) of claim 9 wherein the nanoporous metal foam (90) comprises:
pores (92) surrounded by scaffold struts (94).

11. The electrochemical cell (10) of claim 10 wherein the nanoporous metal foam (90) comprises:
organic catalyst particles that decorate the scaffold struts (94).

12. The electrochemical cell (10) of claim 10 wherein the nanoporous metal foam (90) comprises:
metal catalyst particles that decorate the scaffold struts (94).

13. The electrochemical cell (10) of claim 9 wherein the metal is selected from the:
Platinum Metals Group.

14. The electrochemical cell (10) of claim 13 wherein the metal comprises:
an alloy selected from the Platinum Metals Group.

15. The electrochemical cell (10) of claim 14 wherein the alloy comprises:
platinum.

16. The electrochemical cell (10) of claim 14 wherein the alloy comprises:
ruthenium.

17. The electrochemical cell (10) of claim 5 comprising in addition:
a fuel reformer (14) located with the second electrode (34) that generates hydrogen gas, which enters into fuel cell (12) by penetrating the second electrode (34).

18. A process for operating an electrochemical cell (10) to produce electricity for transmission to an external load comprising:
    a. pumping a reductant through anode electrode (34) of the cell (10);
    b. pumping an oxidizer through cathode electrode (36) of the cell (10);
    c. pumping electrolyte into electrolyte chamber (40) of the cell (10) that is located between the electrodes (34 and 36); and
    d. rotating one electrode (34 or 36) with respect to the other electrode (36 or 34) at a rate sufficient to cause Taylor Vortex Flows (50) in the electrolyte chamber (40).

19. The process of claim 18 wherein:
the rotation of one electrode (34 or 36) with respect to the other electrode (34 or 36) is at a rate sufficient to cause electrolyte Circular Couette Flows in the electrolyte chamber (40).

20. The process of claim 19 wherein the reductant is:
hydrogen.

21. The process of claim 18 in which the cell (10) contains a fuel reformer chamber (26) between a fixed catalytic surface (18) and a rotating catalytic surface (24) and the process comprises an additional step of:
    a. Pumping a fuel containing hydrogen atoms into the fuel reformer chamber (26); and
    b. Rotating the reformer rotating catalytic surface (24) at a speed sufficient to cause—
        i. fuel reformer Taylor Vortex Flows (28) in reformer chamber (26),
        ii. fuel cell Taylor Vortex Flows (50) in the fuel cell electrolyte chamber (40), and
        iii. $H_2$ from the fuel to penetrate through anode electrode (34) to creates $H^+$ ions that pass into the electrolyte chamber (40).

22. The process of claim 21 wherein:
Rotation of one electrode (34 or 36) with respect to the other electrode (36 or 34) is at a rate sufficient to cause Circular Couette Flows (58) in the electrolyte chamber (40).

23. A system for enhancing catalyzed reaction rates at porous catalytic surfaces (34', 36') of an electrochemical cell (10) used to convert chemical energy into electrical energy, the system comprising:
   a. a first electrode (34) having a first porous catalytic surface layer (34');
   b. a second electrode (36) having a second porous catalytic surface layer (36');
   c. the first electrode (34) and the second electrode (36) defining an electrolyte chamber (40) between the first porous catalytic surface layer (34') of the first electrode (34) and the second porous catalytic surface layer (36') of the second electrode (36), the electrolyte chamber (40) including an electrolyte input tube (42) configured so that a liquid electrolyte passing through the electrolyte chamber (40) from the electrolyte input tube (42) passes adjacent the first and second electrodes (34, 36); and,
   d. the electrolyte chamber (40) being dimensioned, and at least one of the first electrode (34) or the second electrode (36) being configured to rotate relative to the other of the first electrode (34) or the second electrode (36) at a rate of rotation adequate to produce Taylor Vortex Flows (50) within the liquid electrolyte flowing from the electrolyte input tube (42) through the electrolyte chamber (40).

24. The system of claim 23, wherein the electrochemical cell (10) comprises:
   a fuel reformer (14) located within the first electrode (34) and having a fuel reformer chamber (26) on the side of the first electrode (34) that is opposite that of the electrolyte chamber (40)
wherein fuel from the reformer chamber (26) penetrates the first electrode (34).

25. The system of claim 24 wherein:
   the first electrode (34) is rotated a rate of rotation adequate to produce Taylor Vortex Flows (28) within the fuel reformer chamber (26).

26. The system of claim 25 wherein:
   the first electrode (34) is rotated at a rate of rotation adequate to produce Circular Couette Flows (28, 50) in the fuel reformer (26) and the fuel cell (12) electrolyte chamber (40).

27. The system of claim 23 wherein the electrodes (34, 36) are separated by an electrolyte chamber (40) to permit one electrode (34) to rotate within the other electrode (36) and the electrolyte chamber (40) has a gap distance d, and gap length L, and further comprising:
   a. means for rotating one electrode (36, 34) with respect to the other electrode (34, 36) at $\Omega$ radians per second;
   b. means for pumping electrolyte into and out of the chamber (40) at a total volumetric exchange rate of $\dot{U}/U$ where U is the volume of electrolyte in the chamber and $\dot{U}$ is the volumetric rate of flow into and out of the chamber (40); and
   c. means for regulating the volumetric exchange rate of axial flow and Taylor Number $T_c$ of vortex flow in the electrolyte so that—

$$T_c = 2r_2\Omega^2 d^3/v^2(1+\{r_1/r_2\}) > 1,715(f\{R_a\}), \text{ and;}$$

$$R_c = \{\Omega r_1 d/v\} \leq 10^4$$

where:
   1. $f\{R_a\} = 1.0 + (0.297)(\log_{10} R_a)^{4.04342}$ for $R_a \geq 1.0$
      $f\{R_a\} = 1.0$ for $0 \leq R_a \leq 1.0$
   2. $r_1$ = the largest radius of the first electrode,
   3. $r_2$ = the smallest radius of the second electrode,
   4. v = kinematic viscosity of electrolyte = $\mu$(poise)/$\rho$ (grams/cc.),
   5. $R_a = (dL/v)(\dot{U}/U)$, and
   6. $\dot{U}/U \geq 0$.

28. The system of claim 23 wherein the electrochemical cell (10) wherein a chemical reactant passing through the cell (10) has a reaction time ($t_a$) within the first or second electrode (36, 34) and comprising in addition:
   means for causing the chemical reactant to pass through a reaction zone of the first or second electrode (36, 34) zone in a length of time ($t_r$) that is at least 10 times a chemical conversion reaction time ($t_a$) for the chemical reactant within the first or second electrode (36, 34).

29. An electrochemical cell (10) used to convert chemical energy into electrical energy and comprising:
   a. a first surface (34') that contains a catalyst,
   b. a second surface,
   c. a fluid between the surfaces (34'36'), and
   d. means (34, 36) for generating Taylor Vortex Flows (50) in
   the fluid that is enveloped by a laminar shear boundary (58) adjacent to one of the surfaces (34', 36').

30. An electrochemical cell (12) used to convert chemical energy into electrical energy and comprising:
   a. a cathode electrode (36, 36'),
   b. an anode electrode (34, 34'),
   c. a fluid electrolyte between the electrodes (36, 36' 34, 34'), and
   d. means (34, 36) for generating a Taylor Vortex Flows (50) in the electrolyte that is enveloped by a laminar shear boundary (58) adjacent one of the electrodes (36, 36' 34, 34').

31. In an electrochemical cell (10) used to convert chemical energy into electrical energy and containing a fluid, an improvement comprising:
   means (18, 24, 34, 36) for creating Taylor Vortex Flows (28, 50) in the fluid.

32. In the electrochemical cell (10) of claim 31, a further improvement comprising:
   means (18, 24, 34, 36) for creating Circular Couette Flows (28, 50) in the fluid.

33. In the electrochemical cell (10) of claim 32, a further improvement comprising:
   one cylinder-like electrode (34) rotating relative to and separated by a fluid chamber (40) from another cylinder-like electrode (36).

34. In the electrochemical cell (10) of claim 33, a further improvement comprising:
   a fluid that is an electrolyte.

35. In the electrochemical cell (10) of claim 33, a further improvement comprising:
   protuberances (60) that extend from a surface layer (34', 36') of an electrode (34, 36) into the Circular Couette Flows (58).

36. In the electrochemical cell (10) of claim 31 in which the means (34, 36) for creating Taylor Vortex Flows (50) includes a first cylindrical-like electrode (36) enclosing a second cylindrical-like electrode (34) separated from the first by an electrolyte chamber (40) of gap distance d and length L and means for rotating one electrode with respect to the other at $\Omega$ radians per second, the improvement further comprising:

a. means for pumping electrolyte into and out of the chamber (40) at a total volumetric exchange rate of $\dot{U}/U$ where U is the volume of electrolyte in the chamber and $\dot{U}$ is the volumetric rate of flow into and out of the chamber; and
b. means for regulating the volumetric exchange rate of axial flow and Taylor Number $T_c$, of vortex flow (50) in the electrolyte so that—
  i. $T_c = 2r_2\Omega^2 d^3/v^2(1+\{r_1/r_2\}) > 1,715(f\{R_a\})$, and;
  ii. $R_c = \{\Omega r_1 d/v\} \leq 10^4$
  where:
   1. $f\{R_a\} = 1.0 + (0.297)(\log_{10} R_a)^{4.04342}$ for $R_a \geq 1.0$
      $f\{R_a\} = 1.0$ for $0 \leq R_a \leq 1.0$,
   2. $r_1$ = radius of the first electrode (36),
   3. $r_2$ = radius of the second electrode (34),
   4. $d = r_1 - r_2$,
   5. $v$ = kinematic viscosity of electrolyte = $\mu$(poise)/$\rho$ (grams/cc.),
   6. $R_a = (dL/v)(\dot{U}/U)$, and
   7. $\dot{U}/U \geq 0$.

37. In the electrochemical cell (12) of claim 36 wherein RPM = 30 $\Omega/\pi$, coordinates of d and RPM are within a Zone of Operable Parameters (70).

38. In the electrochemical cell (12) of claim 33 in which the improvement further comprises:
a. the first electrode (36) is reactive with a first chemical entering its pores from its first surface (44) to produce a first ion at its second surface layer (36'); and
b. the second electrode (34) is reactive with a second chemical entering its pores from its first surface (32) to produce a second ion at its second surface layer (34') having a charge different from that of the first ion.

39. In the electrochemical cell (12) of claim 38, the improvement further comprises:
means for controlling entry of a chemical into pores of an electrode surface layer (34' or 36') so that reaction-time: residence-time $(t_a/t_r,) < 1/10$.

* * * * *